UNITED STATES PATENT OFFICE.

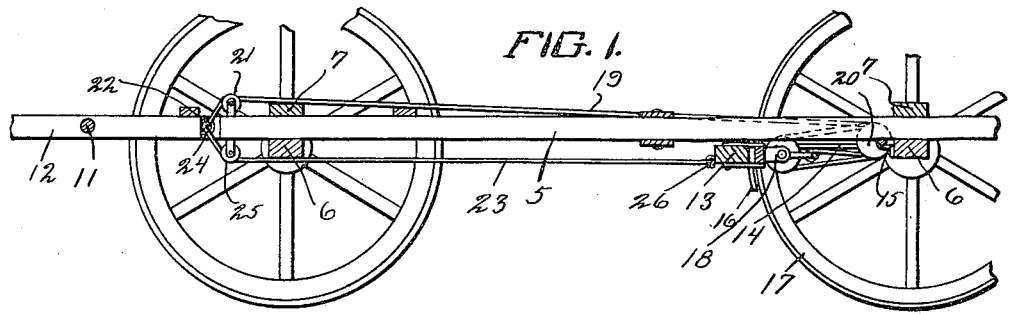
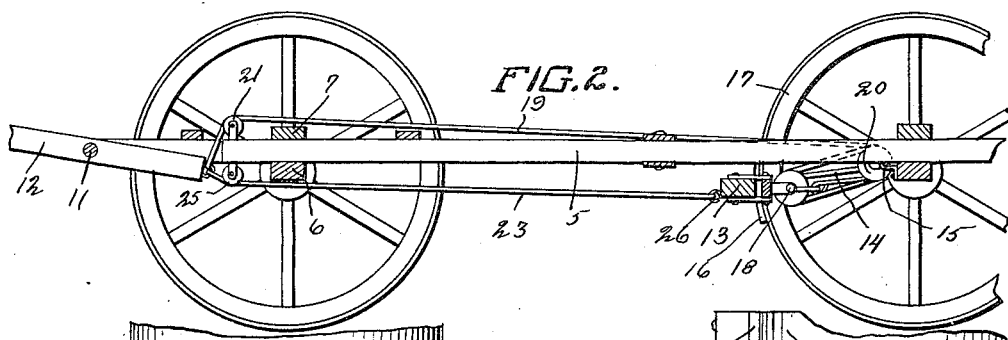
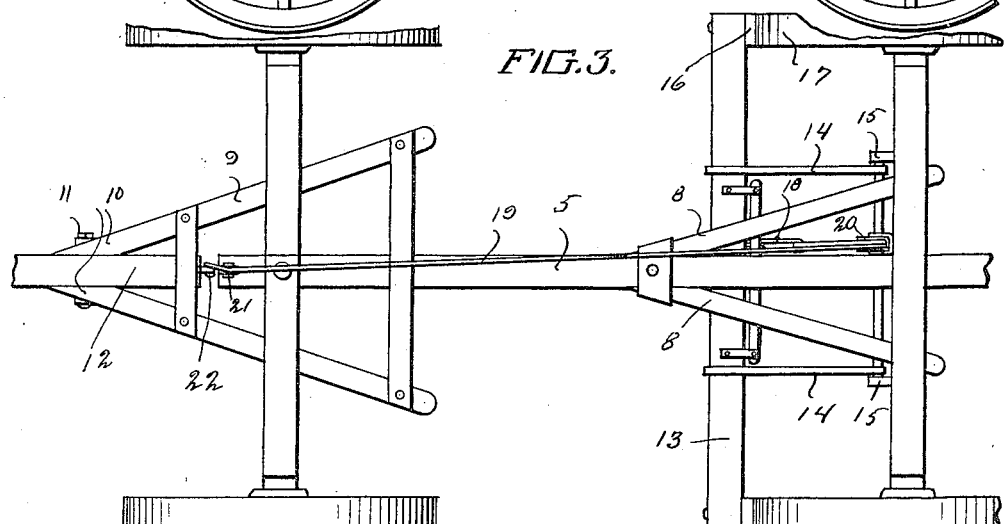
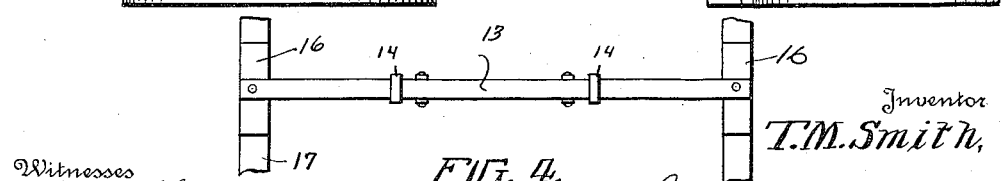

THEEHARMON M. SMITH, OF WAX, KENTUCKY.

AUTOMATIC WAGON-BRAKE.

1,153,967. Specification of Letters Patent. Patented Sept. 21, 1915.

Application filed July 13, 1914. Serial No. 850,763.

*To all whom it may concern:*

Be it known that I, THEEHARMON M. SMITH, a citizen of the United States, residing at Wax, in the county of Grayson, State of Kentucky, have invented certain new and useful Improvements in Automatic Wagon-Brakes; and I do hereby declare the following to be a full, clear, and exact description of the invention, such as will enable others skilled in the art to which it appertains to make and use the same.

This invention relates to brake mechanisms, particularly to brake mechanisms for wagons, and has for its object the provision of a brake mechanism which will be automatically operated by the movement of the wagon tongue when the horses back or hold back in going down a hill.

An important object is the provision of a brake mechanism of this character which will be positively operated and released.

Another object is the provision of a device of this character which will be simple and inexpensive in manufacture and installation, efficient and durable in service and a general improvement of the art.

With these and other objects and advantages in view, the invention consists in the novel construction and arrangement of parts as will be hereinafter more fully described and claimed, and illustrated in the accompanying drawing, in which—

Figure 1 is a vertical sectional view of a wagon equipped with my novel brake mechanism, the brakes being off. Fig. 2 is a similar view with the brakes applied. Fig. 3 is a top plan view, and Fig. 4 is a front elevation of the brake beam with its shoes, portions of the wheels being also shown.

Referring more particularly to the drawing, the numeral 5 designates the reach rod supported upon the usual axles 6 and carrying the ordinary bolsters 7. The rear axle 6 is connected with the reach rod 5 by the usual hounds 8 and the forward axle 6 carries the front hounds 9 between the forward ends 10 of which is pivoted, as shown at 11, the tongue 12.

It is well known that when horses back a wagon or pull back upon the tongue of the wagon in going down-hill, the forward end of the tongue moves upwardly to a considerable degree, dependent upon the degree of upward pressure exerted by the horses. The present invention contemplates the utilization of this backward movement of the tongue for automatically setting the brakes. In order to accomplish this result, I provide a brake beam 13 pivotally supported by rods 14 pivoted upon brackets 15 secured upon the rear axle and carrying brake shoes 16 adapted to engage the wheels 17. A pulley block 18 is secured upon the brake beam 13 and has secured thereto a wire cable 19 which is trained about the pulleys in the block and which is further trained about the pulleys in a similar block 20 secured upon the rear axle. The cable 19 extends forwardly along the reach rod 5, passes over a grooved pulley 21 secured upon the forward end of the reach rod and is secured to the rear end of the tongue 12 as shown at 22. A second cable 23 is secured as at 24 upon the rear end of the tongue, extends over a grooved pulley 25 secured upon the reach rod below the pulley 21, extends rearwardly along the reach rod and is connected with the brake beam 13 as shown at 26.

The tongue 12 being of course pivoted as shown at 11, when the horses back or pull backwardly upon the tongue in going downhill, the forward end of the tongue rises as is well known, whereupon the rear end will be moved downwardly, whereupon a pull will be exerted upon the cable 19, thereby causing the brake beam 13 to be moved rearwardly and thus setting the brakes. When the front end of the tongue 12 returns to its normal position the rear end will rise, whereupon a pull will be exerted upon the cable 23 and the brake beam 13 will be returned to its original position thereby releasing the brakes.

From the foregoing description and a study of the drawing it will be apparent that I have thus provided a simple automatic brake mechanism by means of which the brakes will be set when the forward end of the tongue is moved upwardly by the backward pressure of the horses, and in which the brakes will be released when the pressure by the horses against the tongue is removed.

It will be readily understood that I reserve the right to make various changes in the form, construction and arrangement of parts without departing from the spirit of the invention or limiting the scope of the subjoined claim.

Having thus described my invention, I claim:

In combination with the running gear of a wagon having its tongue pivoted forwardly of its rear end, a brake mechanism comprising pulleys mounted upon the forward end of the reach rod, a cable secured upon the rear end of the tongue, extending over one of said pulleys and connected with the brake beam, a pair of pulley blocks secured, one upon the brake beam and the other upon the rear axle, and a second cable secured upon the rear end of said tongue, passing over the other of said pulleys, trained about the pulleys in said blocks and having its other end connected with one of said blocks.

In testimony whereof, I affix my signature, in the presence of two witnesses.

THE. M. SMITH.

Witnesses:
JEFF GRANT,
GEO. A. SMITH.